United States Patent
Angelilli et al.

(10) Patent No.: US 8,211,296 B2
(45) Date of Patent: Jul. 3, 2012

(54) PORTABLE WATER TREATMENT SYSTEM AND APPARATUS

(75) Inventors: Jerome F. Angelilli, Irving, TX (US); Patrick D. Guccione, Keller, TX (US); Jason M. Melton, Decatur, TX (US); Daniel Wai-tak Wong, Plano, TX (US); John H. Williams, Broken Arrow, OK (US)

(73) Assignee: NCH Ecoservices, LLC, Irving, TX (US)

( * ) Notice: Subject to any disclaimer, the term of this patent is extended or adjusted under 35 U.S.C. 154(b) by 0 days.

(21) Appl. No.: 12/757,403

(22) Filed: Apr. 9, 2010

(65) Prior Publication Data

US 2011/0132815 A1 Jun. 9, 2011

(51) Int. Cl.
*B01D 17/12* (2006.01)

(52) U.S. Cl. ...... 210/87; 210/96.1; 210/194; 210/198.1; 210/205; 210/241; 210/754; 366/136; 422/129; 507/922

(58) Field of Classification Search ............ 210/85, 210/87, 96.1, 143, 170.01, 170.09, 194, 195.1, 210/198, 199, 739, 747, 748.2, 754, 758, 210/764, 765, 805, 205, 241, 752, 755, 756; 175/65, 66, 207; 166/259, 264–267, 271, 166/305.1, 308.1, 308.2, 308.3; 366/136, 366/137; 422/129; 73/152.01, 152.18, 152.19, 73/152.21, 152.29; 507/90, 200, 922

See application file for complete search history.

(56) References Cited

U.S. PATENT DOCUMENTS

| | | | | |
|---|---|---|---|---|
| 4,886,367 A | * | 12/1989 | Bragg et al. | 366/132 |
| 5,516,423 A | * | 5/1996 | Conoby et al. | 210/85 |
| 6,051,135 A | | 4/2000 | Lee et al. | |
| 6,855,294 B2 | | 2/2005 | Taylor | |
| 7,077,995 B2 | | 7/2006 | Roensch et al. | |
| 7,131,495 B2 | | 11/2006 | Hao et al. | |
| 7,326,352 B2 | | 2/2008 | Waldner et al. | |
| 7,448,448 B2 | * | 11/2008 | Lovell et al. | 166/279 |
| 7,578,968 B1 | | 8/2009 | Nalepa et al. | |

(Continued)

FOREIGN PATENT DOCUMENTS

CA 2225297 6/1999

OTHER PUBLICATIONS

The Sabre Companies LLC; Chlorine Dioxide (ClO2) FAQs; http://www.thesabrecompanies.com/faq.aspx; (2011); pp. 1-8.

(Continued)

*Primary Examiner* — Joseph Drodge
(74) *Attorney, Agent, or Firm* — Locke Lord, LLP

(57) ABSTRACT

A portable water treatment system and apparatus is disclosed that can effectively and efficiently treat aqueous fluids by quickly and reliably adjusting and controlling the free residual level of disinfectants, contaminants or additives through the addition of one or more treating agents such as oxidizing chemicals and/or other special-purpose additives, and that can continuously store, log, retrieve and report the related fluid composition data and other operating parameters on a real-time basis at either the use site or a remote location. A preferred use for the subject system and apparatus is managing the chemistry of disinfectant, contaminant and/or additive levels in aqueous fluids used in hydraulic fracturing operations, and controlling the free residual levels of the disinfectant or contaminants within the fluids, including fluids maintained in frac tanks during temporary cessation of a hydraulic fracturing operation.

15 Claims, 7 Drawing Sheets

U.S. PATENT DOCUMENTS

| | | | |
|---|---|---|---|
| 7,604,720 | B2 | 10/2009 | Kaczur et al. |
| 7,699,988 | B2 | 4/2010 | McGuire et al. |
| 7,699,994 | B2 | 4/2010 | McGuire et al. |
| 2005/0023224 | A1* | 2/2005 | Schmitz et al. ............... 210/739 |
| 2005/0079124 | A1 | 4/2005 | Sanderson |
| 2005/0098504 | A1 | 5/2005 | Manz et al. |
| 2005/0219945 | A1 | 10/2005 | Kelley et al. |
| 2005/0244328 | A1* | 11/2005 | Schmitz et al. ............... 423/477 |
| 2006/0021872 | A1 | 2/2006 | O'Leary et al. |
| 2006/0185851 | A1 | 8/2006 | Grimshaw |
| 2007/0102359 | A1* | 5/2007 | Lombardi et al. ............ 210/639 |
| 2007/0187336 | A1 | 8/2007 | Routh et al. |
| 2008/0017586 | A1 | 1/2008 | Matousek et al. |
| 2008/0023407 | A1 | 1/2008 | Eriksson et al. |
| 2008/0156709 | A1 | 7/2008 | Johnson |
| 2008/0200355 | A1 | 8/2008 | Emmons |
| 2008/0236275 | A1* | 10/2008 | Breed et al. ................ 73/290 V |
| 2008/0237141 | A1 | 10/2008 | Kerfoot |
| 2008/0290044 | A1 | 11/2008 | Nanjundiah et al. |
| 2009/0114609 | A1 | 5/2009 | Miller |
| 2009/0127210 | A1 | 5/2009 | Swisher |
| 2009/0230059 | A1 | 9/2009 | McGuire |
| 2009/0255678 | A1 | 10/2009 | Rosine et al. |
| 2009/0281006 | A1* | 11/2009 | Walters et al. ............... 507/270 |
| 2010/0025407 | A1* | 2/2010 | Benson ......................... 220/564 |
| 2010/0038310 | A1 | 2/2010 | Shafer et al. |
| 2010/0059226 | A1* | 3/2010 | Termine et al. ............. 166/308.1 |
| 2010/0078393 | A1* | 4/2010 | Yin ............................... 210/764 |
| 2010/0207019 | A1* | 8/2010 | Hartog et al. .............. 250/269.1 |
| 2010/0307753 | A1* | 12/2010 | Rey et al. .................... 166/305.1 |
| 2010/0307757 | A1* | 12/2010 | Blow et al. ................. 166/308.2 |
| 2011/0000861 | A1* | 1/2011 | Hutchings et al. ............ 210/749 |

OTHER PUBLICATIONS

The Sabre Companies LLC; Mobile Chlorine Dioxide (ClO2) Generator Equipment for Well and Water Treatment—Sabre; http://www.the sabrecompanies.com/sabreenergyservices/services/equipment.aspx; (2011); pp. 1-4.

The Sabre Companies LLC; Three Chemical Chlorine Dioxide Generator—Sodium Chlorite, Hydrochloric Acid, Sodium Hypochlorite; http://www.thesabrecompanies.com/sabreoxidation/services/ThreeChemicalGenerators.aspx; (2011); pp. 1-3.

The Sabre Companies LLC; Chlorine Dioxide (ClO2) Generators for Municipal Water Treatment; http://www.thesabrecompanies.com/sabreoxidation/services/generators.aspx; (2011); pp. 1-2.

The Sabre Companies LLC; Chlorine Dioxide (ClO2) for Water Treatment and Recycling in the Oil and Gas Industry—Sabre; www.thesabrecompanies.com/sabreenergyservices/services/watermanagement.aspx; (2011); pp. 1-2.

The Sabre Companies LLC, Chlorine Dioxide (ClO2) Disinfects Water for Hydraulic Fracturing—Sabre; www.thesabrecompanies.com/sabreenergyservices/casestudies/frac2.aspx; (2011); pp. 1-3.

The Sabre Companies LLC, Chlorine Dioxide (ClO2) for Frac Water Recycling and Reuse—Sabre; www.thesabrecompanies.com/sabreenergyservices/casestudies/frac1.aspx; (2011); pp. 1-4.

* cited by examiner

PORTABLE WATER TREATMENT SYSTEM AND APPARATUS

BACKGROUND OF THE INVENTION

1. Field of the Invention

This invention relates to a portable system and apparatus for treating at least one stream of source water to a defined free residual level of one or more contaminants or other undesirable substituents by the controlled introduction of at least one oxidizing chemical, preferably chlorine dioxide, either alone or in combination with other additives. One preferred embodiment of the invention relates to a portable, self-contained system and apparatus for treating water intended for use in industrial, agricultural, food processing, oil and gas, or other applications. More specific examples of such uses include without limitation for treating industrial cooling water, HVAC cooling water, fruit and vegetable wash water, or poultry wash water, primary and secondary disinfecting of potable water, and treatment of aqueous fluids for subsurface applications such as disinfection, drilling, fracturing, well stimulation, sour well conversion, and well cleanout. One particularly preferred embodiment of the invention relates to a system and apparatus for analyzing and treating source water and produced water (individually or collectively, "frac water") used in hydraulic fracturing fluids ("frac fluids") or aqueous fluids used in other processes for oil and gas wells.

2. Description of Related Art

The use of various oxidizing chemicals and non-oxidizing chemicals for treating water and, more particularly, for treating water used in frac fluids is well known. Because such fluids are routinely injected into well bores and subsurface formations, the possibility always exists that some leakage into the underground water table can occur. Some prior art systems and methods have disclosed introducing chlorine dioxide into fracturing fluids downstream of the fracturing fluid holding tanks ("frac tanks") or forming it in situ downhole. These methods of addition have many disadvantages including, for example, less ability to control the chemical addition or to verify the additive concentration in the treated fluid, lack of portability, lack of a homogeneous blend, limited effectiveness due to pH of the water going downhole, and insufficient contact time or concentrations to kill bacteria. To applicants' knowledge, no one else presently treats the aqueous component of frac fluids upstream of the frac tanks.

A portable system, method and apparatus are therefore needed for effectively and economically treating source water and produced water to a defined free residual level of chlorine dioxide or other oxidizing chemical that ranges from about 0.25 to not greater than about 25 ppm depending upon application and situation. Other beneficial advantages achievable through use of the invention disclosed herein include, for example, the capability for reliably controlling the chemistry of and additive levels in treated water; for safely generating chlorine dioxide in a controlled environment; for independently recirculating, treating and adjusting the chemistry of and additive levels in fluids maintained in individual frac tanks; and, if a leak or overflow of a frac tank occurs, minimizing the amount of treating chemical that is released to the environment with far less harmful environmental impact than would likely be experienced if using traditional water treatment chemistries and methods.

SUMMARY OF THE INVENTION

A portable system, method and apparatus are disclosed herein that can effectively and efficiently treat aqueous fluids by quickly and reliably adjusting and controlling the free residual level of disinfectants, contaminants or additives through the addition of one or more treating agents such as oxidizing chemicals and/or other special-purpose additives, and that can continuously store, log, retrieve and report the related fluid composition data and other operating parameters on a real-time basis at either the use site or a remote location. Such aqueous fluids can be used for a wide range of applications including, for example, treating industrial cooling water, HVAC cooling water, fruit and vegetable wash water, or poultry wash water, primary and secondary disinfecting of potable water, and treatment of aqueous fluids for subsurface applications such as disinfection, drilling, fracturing, well stimulation, sour well conversion, and well cleanout. As used in relation to chlorine dioxide or other oxidizing chemical throughout this disclosure and the appended claims, the term "free residual level" means oxidizing material available to react with biological species after background contaminants or demand have been converted.

The subject invention desirably includes a capability for monitoring, adjusting, controlling and recording physical and compositional parameters such as volumetric flow rate, pH, total dissolved solids ("TDS"), chlorine dioxide level, density, salinity, conductivity, oxidation reduction potential ("ORP"), viscosity, temperature and pressure of the aqueous fluid, and concentrations of other detectable cations and anions, and for using the resultant information to determine a preferred treatment rate for each treating agent. Examples of such detectable cations include aluminum, ammonium, barium, calcium, chromium (II, III), copper (I, II), iron (II, III), hydronium, lead (II), lithium, magnesium, manganese (II, III), mercury (I, II), nitronium, potassium, silver, sodium, strontium, and tin (II). Examples of such detectable anions include simple ions such as hydride, fluoride, chloride, bromide, iodide, and oxoanions such as arsenate, arsenite, thiosulfate, sulfite, perchlorate, chlorate, chlorite, hypochlorite, carbonate, and hydrogen carbonate or bicarbonate.

Although the safe or permitted concentrations of various available oxidizing chemicals can vary, the concentration range of chlorine dioxide that has been determined to be safe for human ingestion is less than 5 ppm, with less than 0.8 ppm being preferred for potable water. The recently proposed "AWW Standard" (for Angelilli, Wong, Williams) is a more preferred standard, however, because it is defined in terms of the requirements under the relevant United States EPA and FDA standards. Under the AWW Standard, chlorine dioxide concentrations ranging from 0.25 up to 5 ppm are preferred for fluids pumped downhole, while the chlorine dioxide concentration for produced water should not exceed 0.8 ppm. For use in the present invention, operational levels of unreacted chlorine dioxide ranging from about 0.25 to about 25 ppm are acceptable, with levels ranging from about 0.25 to about 5 ppm chlorine dioxide, being preferred. A low level, such as 0.25 ppm, of chlorine dioxide in an aqueous fluid indicates, for example, that all bacteria have been removed and the fluid has been disinfected without totally exhausting the supply of the disinfecting oxidizing chemical. The use of additive concentration levels higher than 5 ppm, such as up to 25 ppm for example, is generally preferred where the aqueous fluid is more highly contaminated or where the bacterial or contaminant load is highly variable.

According to one preferred embodiment of the invention, a portable in-line system, method and apparatus are disclosed herein that can be used to blend and treat source water and/or produced water that is utilized in frac fluids pumped into oil or gas wells to reliably control bacterial contaminant levels within a predetermined range. As used herein, the term "source water" includes, for example, surface water from a frac water pond, water drawn from different points within a particular surface water source, trucked-in water, and any other water that may be available from an alternative source such as a pressurized line. The subject frac water management system is intended to operate in-line between the water source and the frac tanks, with the treating chemicals being introduced through an eductor, primarily utilizing the motive force of the frac water supply pumps to provide the energy for chemical mixing. Alternatively, auxiliary pumps can be used if desired for introducing oxidizing chemicals or other additives into the flowing frac water. The system, method and apparatus of the invention can be used to proportionally blend source and produced water, source water from different sources or pick-up points, and source water or produced water in combination with a flow of previously treated frac water as desired.

As used throughout this disclosure and the appended claims, the term "portable" means transportable either by towing or by mounting on or in one or more trailers or motor vehicles so as to provide a self-contained treatment and monitoring system that is rapidly connectable to provide in-line access to other fluid flow lines, devices or equipment. In the context of flow lines, devices or equipment used to implement a hydraulic fracturing operation for an oil or gas well, "portable" includes everything needed to install and operate the system, method and apparatus disclosed herein between frac water supply pumps and frac tanks that are already in place. In this context, it should be appreciated, however, that produced water held in a "flow-back" tank located among or nearby frac tanks should be viewed as part of the aqueous fluid supply system that is disposed upstream of the system, method and apparatus of the invention.

According to another preferred embodiment of the invention, a produced water management system is also provided. Produced water is preferably blended into other source water provided to the system and apparatus of the invention prior to treatment of the frac water in accordance with the method of the invention. A proportional mixing system is disclosed that facilitates such blending in accordance with the objective of treating the resultant mixture to produce treated water having a defined free residual level of contaminants below a predetermined maximum level or within a predetermined range. Using this invention, the water input to a hydraulic fracturing operation can be managed according to parameters and concentrations of detectable cations and anions as identified in paragraph [0005].

The use of sequential treatment points for introducing more than one treatment chemical or additive into a single pressurized flow of aqueous fluid or for introducing a single treatment or additive at sequentially spaced points in a single pressurized flow upstream of the frac tanks is also included within the scope of the present invention. The ability to react in real-time to a changing volume of aqueous fluid or to selectively define the volume of aqueous fluid to be treated using the system, method and apparatus of the invention are both elements of the invention that can be important to achieving operational success and consistently positive outcomes.

According to another preferred embodiment of the invention, an oxidizing chemical agent is used to treat bacterial or other biological contaminants present in frac fluids. A preferred oxidizing chemical agent is chlorine dioxide, although other similarly effective oxidizing agents such as ozone, peroxides and persulfates can be similarly used at varying concentrations with varying results for some applications. Chlorine dioxide is preferably generated in situ within the system and apparatus of the invention from chemical precursors, the preferred method of which includes the use of sodium hypochlorite, hydrochloric acid, and sodium chlorite that are introduced into the reactor in liquid form and that react upon contact with each other in an acidic aqueous environment generally having a pH of less than about 6. The oxidizing chemical is preferably introduced into a zone of turbulent flow of the frac fluid through an eductor disposed upstream of the frac tanks, thereby achieving better mixing and better contact with the particular contaminant(s) then being treated. The treatment rate is preferably regulated automatically by a self-modulating stoichiometric controller that varies the amount of oxidizing chemical delivered to the aqueous fluid stoichiometrically depending upon demand. Use of the system and apparatus of the invention in accordance with the subject method can produce "kill rates" of biological contaminants that typically exceed 99.99%.

By introducing treating chemical or additive into a sidestream drawn from the main flow of pressurized aqueous fluid in accordance with one preferred embodiment of the invention, it is possible to reduce the likelihood or a possible adverse effect or outcome from "overshooting" the target concentration of the chemical or additive. This technique is facilitated by the use of a "PID loop" (process value, interval and derivative) or proportional independent digital control ("fuzzy logic") system in the design, implementation and use of the present invention.

According to another embodiment of the self-contained apparatus of the invention, integral safety devices are desirably provided that are automatically activated to warn workers of any dangerous level of chlorine dioxide and to isolate the chlorine dioxide generator of the invention, neutralize and purge the apparatus with sodium sulfite without exposure to chlorine, caustic, or otherwise harmful chemicals. Audible and visual alarms, a safety stop and two isolation valves, preferably tritium ball valves, are desirably provided for each reactor. A flow sensor and pressure gauge also provide real-time input to the safety devices used in conjunction with the chlorine dioxide generator. A specially modified PVC cleanout for the chlorine dioxide reactor is also provided.

According to another preferred embodiment of the system and apparatus of the invention, a portable distribution manifold is provided upstream of the frac tanks in a hydraulic fracturing operation, which manifold can be selectively used in accordance with the method of the invention to introduce treated water into one or more frac tanks, or to recirculate frac fluid disposed in one or more tanks for possible further treatment, particularly during periods when hydraulic fracturing operations are shut down or during other quiescent periods when fluid maintained in one or more frac tanks is otherwise at rest. By recirculating frac fluids during such quiescent periods, better homogeneity is maintained within each tank, less precipitation of suspended solids occurs, and the time required to resume hydraulic fracturing operations with a fluid of a known and reliable composition is significantly reduced. According to another preferred embodiment of the invention, a frac tank circulation and monitoring system, method and apparatus are also disclosed that comprise and utilize at least one auxiliary pump, a separate programmable logic controller ("PLC") and, most preferably, a secondary injection point, to precisely trim or control the residual chlorine dioxide level in each frac tank. This capability for continuously turning the water over and for monitoring and trimming the chlorine dioxide or other additive levels in each frac tank also enables the system operator to control compositional parameters in each frac tank even when the site operator is not performing a hydraulic fracturing operation in the associated well(s). Auxiliary booster pumps are desirably provided within the system and apparatus of the invention to establish fluid circulation through the system and apparatus whenever inlet water supply pumps are not operating during shutdown of the hydraulic fracturing operation. Use of the auxiliary circulation system can also provide freeze protection during otherwise quiescent periods in winter. Because the composition of the frac fluid in each separate frac tank, including the associated contaminant and additive levels, typically varies, use of the subject circulation and monitoring system of the invention facilitates management of the water chemistry in each tank.

According to another embodiment of the invention, a new control, data storage and reporting system is disclosed that has the capability to control operations from either onsite or remote locations and to retrieve and reuse stored data to supplement temporary sensory loss at any point within the system.

BRIEF DESCRIPTION OF THE DRAWINGS

The portable water treatment system and apparatus of the invention is further described and explained in relation to the following drawings wherein.

DESCRIPTION OF THE PREFERRED EMBODIMENTS

Figure 1:
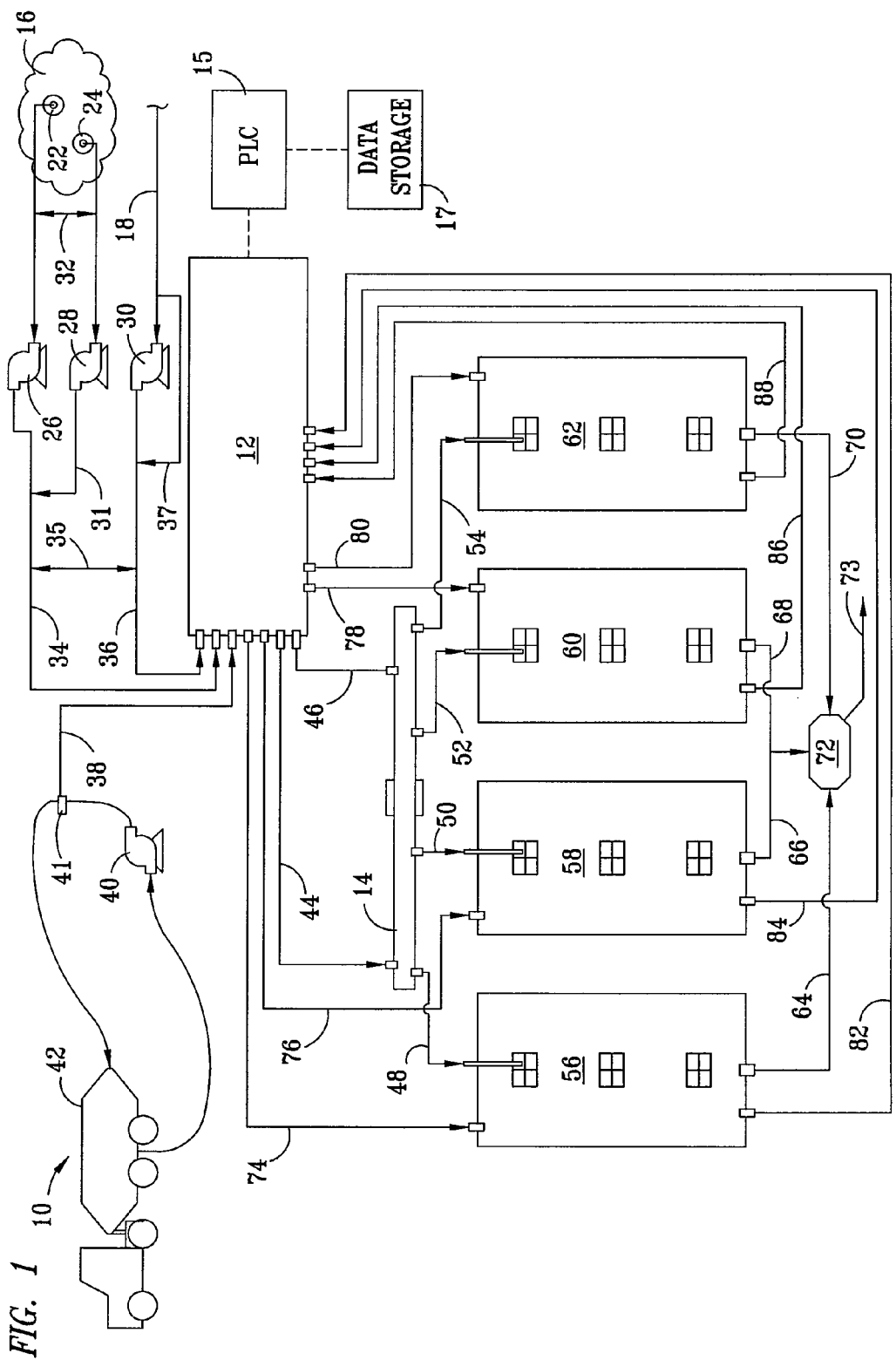
FIG. 1 is a simplified schematic of one preferred embodiment of the portable water treatment system of the invention.

As shown in simplified form in FIG. 1, portable water treatment system 10 utilizes a plurality of inlet water supply pumps 26, 28, 30 and 40 supplying water to a portable carriage device, most preferably a trailer 12, as defined above. If needed, depending upon factors such as, for example, the number and size of the flow lines, and the size of trailer 12 or such other towable or motorized carriage device as may be used, all or part of the apparatus of FIG. 1 disposed between the water inlet lines exiting the pumps and frac tanks 56, 58, 60, 62 can be installed in two or more companion devices such as two trailers, a truck and a trailer, or the like, or can even be skid-mounted for rapid deployment and installation at a use site. If installed inside a trailer, truck or the like, the subject apparatus can be installed in modules on racks, rails or skids as needed and secured in place by appropriate conventional or commercially available means.

Utilizing crossover 32, which will contain at least one valve that is not shown, either or both of pumps 26, 28 can draw source water from a plurality of pick-up points 22, 24 in frac water pond 16. It should be appreciated that valving and instrumentation are not shown in FIG. 1, which is intended to lay out an example of one suitable flow scheme as implemented at a use site. It should also be appreciated that the chemistry and solids content of the frac water drawn from different pick-up points in the same frac water pond 16 can vary. Although flow lines 34, 31 from pumps 26, 28, respectively, are depicted as providing a single combined inlet flow to portable treatment system 10, it should be appreciated that more than a single flow line from frac pond 16 to portable treatment system 10 can be provided if desired.

Pump 30 can optionally draw produced water from an auxiliary source such as a frac tank dedicated to flow-back service, or can draw water from another source to provide another pressurized inlet to portable treatment system 10 as desired. By providing a crossover line 35 with a control valve between lines 34 and 36, source water and produced water can be blended together in any desired proportion prior to reaching portable treatment system 10. If the auxiliary source is already pressurized, a bypass line 37 can be provided to bypass pump 30. If needed, still another auxiliary aqueous liquid source such as tank truck 42 can be provided. As shown in FIG. 1, pump 40 can recirculate aqueous liquid through tank truck 42, or can pump the liquid directly to portable treatment system 10 through another inlet flow line 38. Although pump 40 is shown as being free-standing, it will be appreciated that pump 40 can also be mounted on tank truck 42.

As is discussed in greater detail below, a significant advantage of portable treatment system 10 of the invention is that inlet water supply pumps 26, 28, 30 are typically already in place at the well site for pumping inlet water to a conventional hydraulic fracturing system. By providing quick-connect couplings to the inlet lines that are already built in to portable treatment system 10, the hook-up time is minimized. Because the force required to move the frac water through the system and apparatus of the invention is provided by the regular inlet water supply pumps, no additional pumps are required except as described below for other auxiliary portions of the subject system. In a typical installation, the inlet lines to portable treatment system 10 are about 10 inches in nominal diameter and carry up to about 6500 gallons per minute at a pressure of up to about 120 psi. This same motive force is desirably used in a preferred embodiment of the invention to educt treating chemical such as chlorine dioxide, first into a sidestream and then into the primary fluid flow.

The structure, use and operation of apparatus disposed in trailer 12 in portable treatment system 10 of the invention to treat the source and produced water in accordance with the method of the invention are further described below in relation to FIGS. 2-6. It should be understood that the number of individual flow lines and the number of additive injection points in each flow line can vary within the scope of the invention. Although three separate inlet flow lines 34, 36 and 38 are shown entering trailer 12 in FIG. 1, the number can be one or more and, if desired, an inlet manifold can be provided to proportion and distribute flow into any one of a plurality of individual flow lines to serve as the primary fluid flow paths through portable treatment system 10. One significant advantage of water treatment system 10 is that all the flow sensors, instrumentation and controls are desirably electronically linked to at least one programmable logic controller ("PLC") and data storage and retrieval unit disposed inside trailer 12 and also to at least one PLC and data storage and retrieval unit located at some remote site. This control system enables users to operate system 10 and to control the method and apparatus of the invention from the well site or, if needed, from a remote location. Also, while system 10 is preferably operated using real-time data, it can also be operated using saved operating data and parameters should needs dictate, especially for short periods of time.

Referring again to FIG. 1, following treatment of the water directed through the individual flow lines inside trailer 12, two treated water streams 44, 46 are shown entering manifold 14. From manifold 14, the treated water can be selectively discharged through flow lines 48, 50, 52, 54 into any one or more of frac tanks 56, 58, 60 or 62, respectively. Although four frac tanks are shown, more or fewer frac tanks can be used within the scope of the invention. In conventional practice, the chemistry and contaminant level of the various frac tanks can vary greatly, and one or more frac tanks can be dedicated to flow-back water that is recovered from the wellbore subsequent to hydraulic fracturing.

Depending upon the construction of and the flow control system used for manifold 14, the water introduced into frac tanks 56, 58, 60 and 62 through flow lines 48, 50, 52, 54 can have the same or different chemistries as desired, but according to a preferred embodiment of the method of the invention, all treated water entering any one of the frac tanks will have free residual levels of any treating chemical that do not exceed predetermined maximum values.

On the outlet side of frac tanks 56, 58, 60 and 62, outlet flow lines 64, 66, 68 and 70 are provided as a flow path for treated frac water to move to blender 72, where it can be combined with other conventional additives such as proppants and the like that are used in hydraulic fracturing fluids. One or more booster pumps, not shown, can be provided downstream of frac tanks 56, 58, 60, 62 to move treated frac water to and through blender 72 from the frac tanks, and from blender 72 to the primary injection pump, not shown, for the hydraulic fracturing fluid. Although the flow of fracturing fluid from the frac tanks to the blender and then downhole is conventional technology and is not part of the present invention as narrowly defined, it should be noted that recirculation lines 82, 84, 86 and 88 from frac tanks 56, 58, 60, 62, respectively, back to portable treatment system 10 are part of the invention. The provision and use of system 10 having the capability of selectively recirculating and treating fluid from any one or more of the frac tanks by the use of one or more auxiliary pumps (seen in FIG. 2B), even when all of primary pumps 26, 28, 30, 40 are shut down, enables an operator to consistently maintain the same or different fluid chemistries in each frac tank as desired. It should be understood and appreciated that individual recirculation lines 82, 84, 86 and 88 can be used to carry fluid back to the chemical treating portion of system 10 independently, or can be consolidated into a single return header as desired, providing such pumps as may be required to implement such various flow schemes.

Unlike conventional hydraulic fracturing systems, frac water treatment system 10 of the invention provides the capability for intermittently or continuously recirculating aqueous liquid from each individual frac tank back to the water treatment trailer, where the water chemistry and additive levels in each frac tank can be adjusted as desired. Auxiliary pumps are desirably provided inside portable treatment system 10 to provide motive force for the recirculation. Such recirculation helps prevent settling of solids into the bottom of each frac tank, promotes mixing and homogeneity of the fluid inside each tank, and provides freeze protection at low ambient temperatures. The ability to maintain desirable water chemistry and additive levels in each frac tank as desired during periods of inactivity when hydraulic fracturing operations are not underway reduces the start-up time otherwise required when activities resume and provides a more consistently reliable frac water source than has previously been available to those engaged in drilling and production. Frac water recirculated from the frac tanks to portable treatment system 10 and treated in accordance with the method and apparatus of the invention as are further described below in relation to FIGS. 2-6 is desirably returned to frac tanks 56, 58, 60 and 62 through recirculation return lines 74, 76, 78 and 80, respectively. It should be appreciated by those of skill in the art upon reading this disclosure that the system, method and apparatus of the invention will enable an operator to discharge treated aqueous fluid directly into any selected frac tank, or to discharge treated fluid into manifold 14 from which it can also be distributed into any one or more frac tanks as desired.

Where one or more frac tanks are used to hold flow-back or produced water, that water can be recirculated to portable treatment system 10 and proportionally blended into source water as previously described, or can be separately treated and returned to the flow-back tank as described above for the recirculated aqueous liquids. In the former case, the treated produced water flows into manifold 14 with the other treated source water, and in the latter case, the treated produced water flows directly back into the flow-back or produced water tank.

Generally speaking, the method of the invention includes determining the inlet flow rate and an initial set of fluid properties and compositional parameters for the incoming frac water. Such parameters can include, for example, volumetric flow rate, pH, TDS, chlorine dioxide level, density, salinity, conductivity, ORP, viscosity, temperature and pressure of the aqueous fluid, and concentrations of other detectable cations and anions, and for using the resultant information to determine a preferred treatment rate for each treating agent. Examples of such detectable cations include aluminum, ammonium, barium, calcium, chromium (II, III), copper (I, II), iron (II, III), hydronium, lead (II), lithium, magnesium, manganese (II, III), mercury (I, II), nitronium, potassium, silver, sodium, strontium, and tin (II). Examples of such detectable anions include simple ions such as hydride, fluoride, chloride, bromide, iodide, and oxoanions such as arsenate, arsenite, thiosulfate, sulfite, perchlorate, chlorate, chlorite, hypochlorite, carbonate, and hydrogen carbonate or bicarbonate. Except for the flow rate through the large-diameter pipes, most of the fluid properties and compositional parameters are desirably determined in, and treating chemicals and additives are desirably introduced into, sidestreams of reduced flow that are diverted into and out of the primary flow lines through lateral wyes. To the extent possible, the relevant properties and parameters are determined using in-line sensors and gauges, with valves and sample ports provided as needed to facilitate data and sample collection, and quality control.

By managing the chemistry and composition of frac water upstream of the frac tanks in accordance with the method of the invention, several operational benefits are achieved. Once the initial water properties and parameters are determined, set points are chosen and verified for the concentrations of treating chemicals and additives to be introduced into the fluid flow before the frac water reaches the frac tanks. According to one preferred embodiment of the invention, each treating chemical or other additive (and especially where chlorine dioxide is the primary treating chemical) is introduced in two sequential increments in two different sidestreams that are longitudinally spaced apart along the flow path of each primary flow line. Treating chemicals and additives are desirably introduced into the primary flow lines in regions of turbulent flow to facilitate dispersion. One or more PLCs are desirably used to calculate the addition rates needed to produce a desired final concentration of each treating chemical and additive in the treated water that exits the system, and to operate the valves as needed to achieve the desired final concentration. In some cases, treated fluid can be recirculated through the treating apparatus of the invention to incrementally adjust the concentration of treating chemicals or additives to a desired level.

Through use of the method of the invention, which can be implemented in a preferred embodiment with the portable system and apparatus as disclosed herein, users can now exercise control over the composition of aqueous fluids in ways not previously achievable using conventional water treatment methods. For example, the method of the invention enables one to make real-time adjustments to the concentration of treating chemicals and additives in a pressurized flow of aqueous liquid in response to changes in composition of the incoming source water, no matter whether such compositional changes are attributable to different liquid sources or pick-up points, different degrees of contamination with differing treatment demands, different types and sources of contaminants, or the like. Similarly, the subject method enables one practicing the invention to target and maintain a desired concentration of a particular treating chemical or additive in a pressurized aqueous flow by the sequential addition of differing amounts of the chemical or additive coupled with systematic monitoring and comparison to the benchmark level to determine the desired magnitude of the next compensating adjustment. Use of the subject method also enables an operator to maintain control over the composition of an aqueous stream from the use site or from a remote location and, when the flow of aqueous liquid is interrupted for whatever reason, to continue recirculating an aqueous liquid to monitor and/or treat the fluid as necessary in response to a demand, target concentration, or other such parameter.

As applied to fracturing operations for oil and gas wells in particular, the subject method can be implemented to allow an operator to achieve many different objectives. Such objectives include, by way of illustration and not of limitation, to proportionally blend source and produced water, to treat either inlet stream independently of the other, to treat a combined inlet stream, to treat with one or more oxidizing chemicals either alone or in combination with other additives such as scale and corrosion inhibitors, to retreat sequentially with a single chemical or additive, to selectively direct treated water to and through a distribution manifold that is part of the subject system and that is located upstream of the frac tanks, to selectively recirculate a portion of the treated liquid to be reintroduced into the inlet stream to retreat or to help balance the composition and chemical or additive concentration of the incoming stream, to achieve a targeted chlorine dioxide concentration in frac water, and to recirculate through individual frac tanks to maintain, balance or vary the water chemistry and concentrations of chemicals and additives in various frac tanks.

A preferred method for introducing treating chemical such as chlorine dioxide and additives such as scale inhibitor and corrosion inhibitor into the frac water flowing through the apparatus of the invention is by use of at least one eductor installed in fluid communication with each side stream in which treating chemical or additive is to be introduced. Alternatively or supplementally, one or more treating chemicals and/or additives can be introduced into the fluid flow using small volume positive displacement injection pumps. The treating chemicals or additives introduced into the frac water using the method of the invention can be produced in situ or can be provided in useable quantities or amounts from other sources and stored inside the trailer or in another carriage device that is consistent with applicable storage and handling requirements or regulations and also compatible with the objectives of portability, effectiveness and efficiency during transportation and use of the system, method and/or apparatus of the invention. Such storage means can include, for example, drums, totes, tanks or other containers of appropriate volume in combination with such chemical transfer devices and ancillary controls and safety precautions as are known to those of ordinary skill in the art to be desirable or necessary for the particular conditions or circumstances of use.

A preferred treating chemical for use in the method of the invention is chlorine dioxide, and a preferred method for providing chlorine dioxide to the frac water treatment system of the invention is generating it in situ inside a reactor system that further comprises a dedicated PLC, a reaction chamber with a dedicated alarm and safety system, and a purge and cleanout system. The use of two or more treating chemical reactors or generators is preferred in practicing the method of the invention. Chlorine dioxide can be provided or generated using one, two and three precursor systems and appropriate reactors that are commercially available from various manufacturers or suppliers. A preferred reactor for use in practicing the method of the invention can be used to generate chlorine dioxide from three precursors that meet in liquid form and react in the presence of water sprayed into the reactor. Three preferred precursors are sodium hypochlorite, hydrochloric acid and sodium chlorite. A preferred alarm and safety system for use in the invention comprises both audio and visual alarms, pressure gauges, and remote and onsite automatic and manual safety stop valves that isolate the reactor on both the inlet and outlet sides. A preferred purge and cleanout system includes a sensor-activated sodium sulfite purge and a PVC cleanout that is located above the reactor and is resistant to corrosion and degradation (better than stainless steel) when used in this application. Sodium sulfite is particularly preferred for use in purging the reactor system because of its high, virtually infinite, solubility in chlorine dioxide, and sits on top of the reactor.

One preferred method of the invention is further described in relation to FIG. 2, wherein source water 202 is supplied to primary flow line 220 from a frac pond or another other pressurized line source. It will be appreciated that conventional, commercially available control valves, check valves, back-check valves, flow meters, gauges, indicators, transducers, transmitters, controllers, control lines, tees, wyes, safety stops, alarms, indicator lights, and the like that are well known to those of skill in the art for implementing a method such as that described herein are not shown in FIG. 2, which is primarily intended to describe the process flow through the system and apparatus of the invention. More particular mechanical descriptions are provided in connection with FIGS. 3-5 below, which are more narrowly directed to implementation of the chlorine dioxide generation aspect of the invention and introduction of the treating chemicals and additives into the primary flow lines by use of an eductor.

Figure 2A:
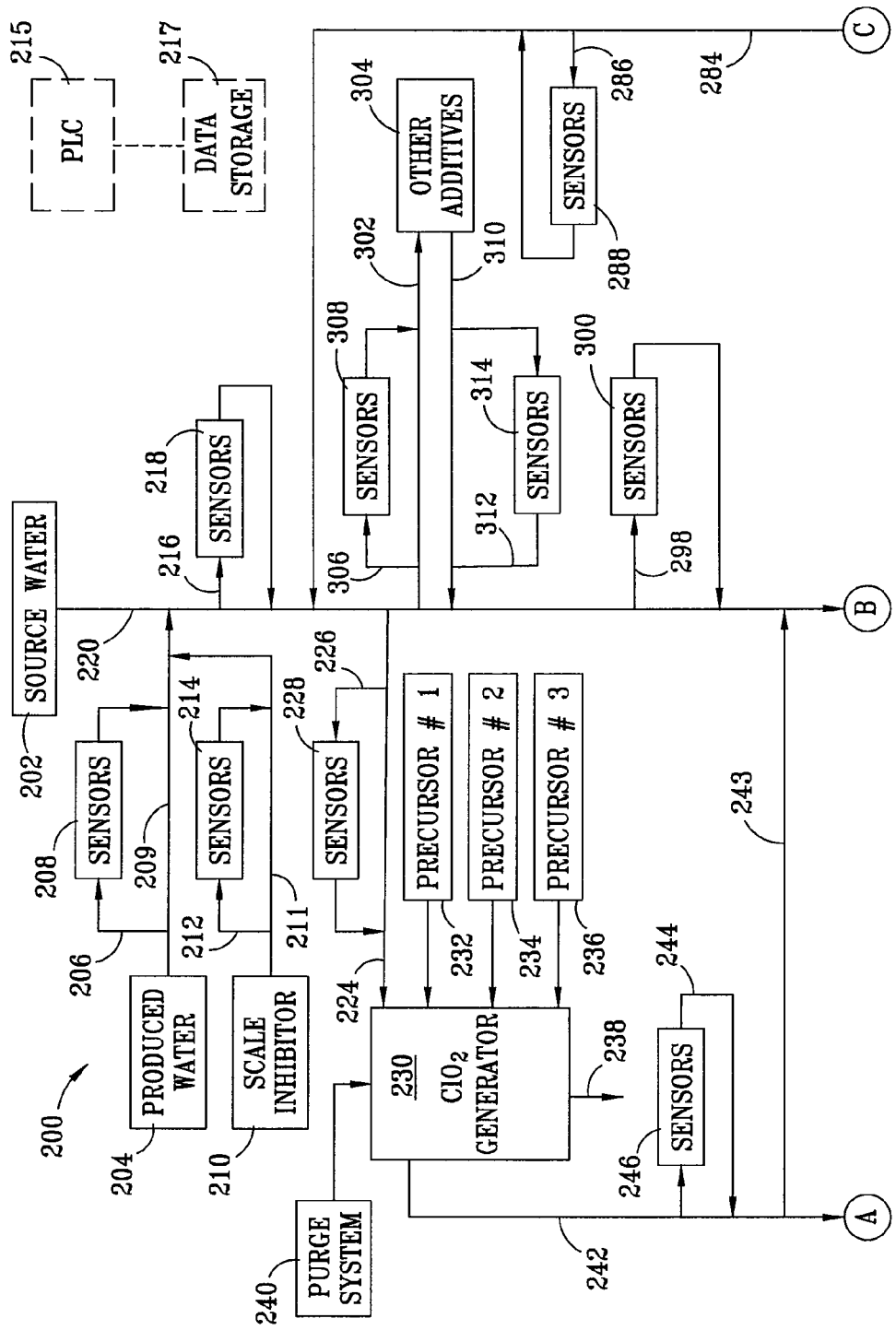
FIGS. 2A and 2B together depict a simplified process flow diagram illustrating one preferred embodiment of the method of the invention.

Although only one primary flow line is shown in FIG. 2A, it should be appreciated that two or more primary flow lines can be operated in parallel within the scope of the invention. Produced water 204 is similarly introduced through line 209 into primary flow line 220. Because frac water supply pumps (seen in FIG. 1) are already in place at most well locations, the system and apparatus of the invention can be inserted and connected downstream of the supply pumps and upstream of the frac tanks to pretreat the frac water in a way not previously achievable and using the motive force already in place to move the aqueous fluid through the water treating system.

Scale inhibitor 210 can be introduced into the produced water through line 211 because of the relatively high proportion of mineral contaminants likely to be contained in produced water 204. Scale inhibitor 210 can be introduced into the pressurized flow of produced water using a commercially available injection pump or by the use of an eductor disposed at the inlet into the flow of produced water 204. Similarly, although not shown in FIG. 2A, it will be appreciated that corrosion inhibitor or other additives or chemicals can likewise be introduced into produced water 204 or directly into primary flow line 220 if needed. Side streams 206, 212, 216 having reduced flow can be provided if desired to facilitate the placement and use of sensors 208, 214, 218 for determining flow parameters and compositions as needed.

The primary flows as exemplified by primary flow line 220 each pass through control valves having onsite or remote indicators that display the inlet water flow rates and TDS for each flow. All necessary flow monitoring and control systems are desirably capable of being powered by a self-contained power source such as a combination of auxiliary batteries and generators supporting the system and apparatus of the invention, although AC power can also be provided onsite from remote generators or other available electrical power sources in many cases and converted to DC power where required. Sensors 214 can comprise pressure gauges and flow rate and set point indicators that are linked to valves that control the optional flow of scale inhibitor into produced water 204. Flow rate and set point indicators similarly control the proportion of produced water 204 that is combined with source water 202 into primary flow line 220. The aqueous fluid supply lines can also be provided with control valves and safety valves having status indicators and alarms as needed.

Sensors 228 in side stream 226 whose inputs are directed to at least one on-site and at least one remotely located PLC 215 linked with flow rate and set point indicators and control valves determine the flow 224 of inlet water to one or more chlorine dioxide generators 230. Each PLC 215 is also desirably linked to a data storage and retrieval unit 217 that is capable of providing operational inputs to PLC 215 from stored data if needed due to instrument failure or other circumstances. Each chlorine dioxide generator 230 preferably produces chlorine dioxide from precursors 232, 234 and 236 that preferably include sodium hypochlorite, hydrochloric acid and sodium chlorite. Although a three-precursor system and the generation of chlorine dioxide within the confines of the portable apparatus of the invention are preferred, it will be understood by those of skill in the art upon reading this disclosure that other devices and systems for providing chlorine dioxide or other oxidizing chemicals can also be used to practice the subject method, such as for example, 1- or 2-precursor systems for generating chlorine dioxide. The use of in situ generation of chlorine dioxide in combination with the use of an eductor instead of injection pumps to introduce the treating chemical into a pressurized flow of aqueous liquid such as frac water has proved to be an efficient and effective method for managing a frac water treatment system.

Chlorine dioxide generator 230 is desirably provided with safety valves and alarms suitable for isolating the generator in case of an operational failure or unsafe condition. A sodium sulfite purge 240 is desirably provided above generator 230 to flood the chlorine dioxide generator in case of emergency, and cleanout 238 is provided for use in cleaning and restarting the reactor, especially following an emergency shutdown. Treated water flow 242 exiting chlorine dioxide generator 230 can be selectively controlled and directed back into primary inlet water flow 220 through line 243 by control valves having status indicators visible at a proximal and/or remote control panel, with the flow parameters and treating chemical concentration being determined and indicated by sensors 246 disposed in side stream 244.

Figure 2B:
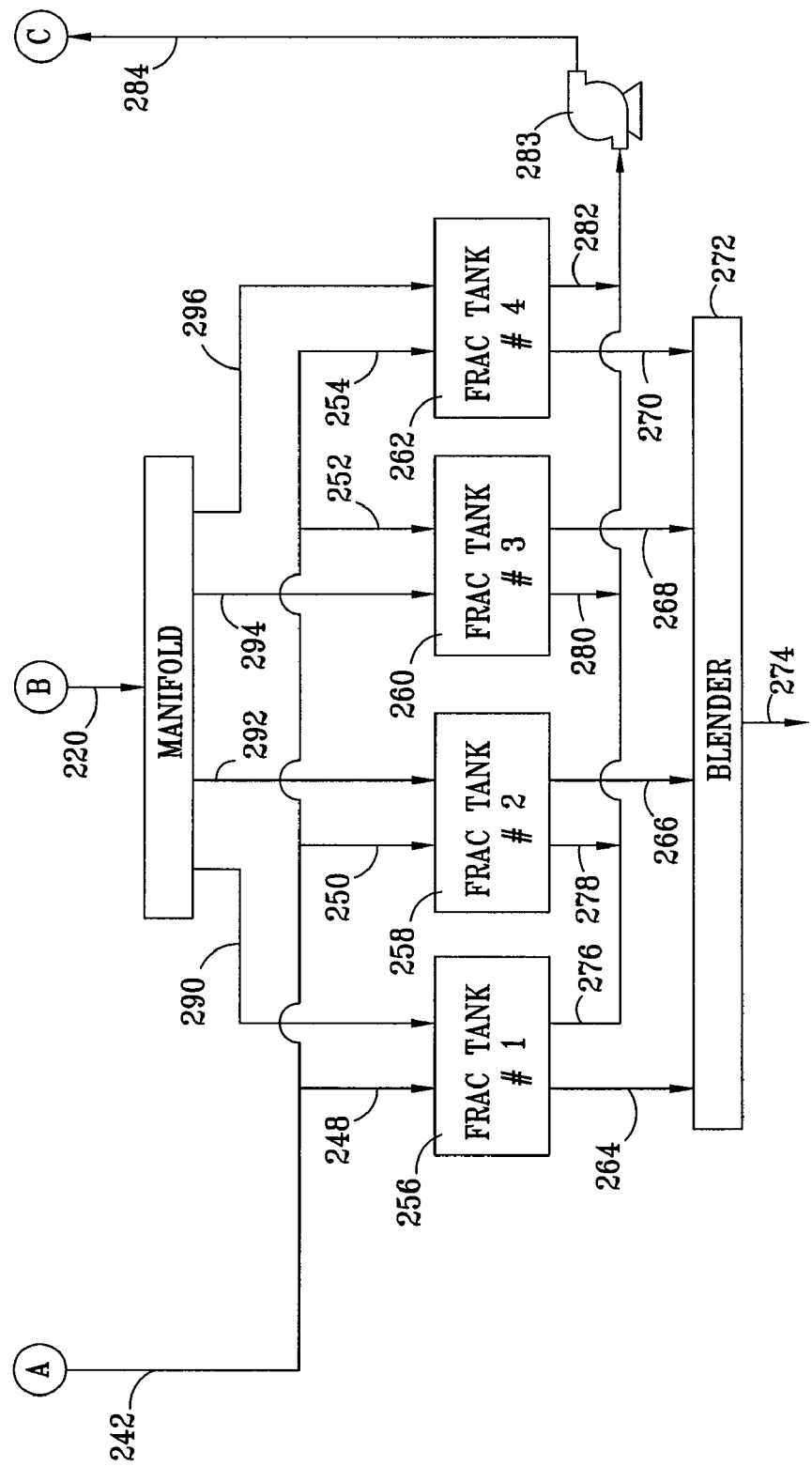

A further aspect of the method of the invention relates to frac tank monitoring. According to one preferred embodiment of the invention, a separate controller is provided for each frac tank, and each frac tank is provided with a secondary injection point to precisely trim or control the residual level of chlorine dioxide or other treating chemical or additive in that frac tank. Referring to FIG. 2B, treated water flowing through line 242 can also be selectively distributed through any or all of inlet lines 248, 250, 252 and 254 directly to frac tanks 256, 258, 260, 262, respectively. Treated water entering primary flow line 220 through line 243 flows into the manifold that is also part of the invention, through which the treated water can be selectively distributed to any or all of frac tanks 256, 258, 260, 262 through inlet lines 290, 292, 294 and 296, respectively.

Referring again to FIG. 2A, one or more other treating chemicals or additives 304 can be introduced into primary inlet water flow line 220 using side stream supply line 302, return line 310, each of which can be fully instrumented by one or more sensors 308, 314. Side stream 298 and sensors 300 affords an opportunity to monitor the affect of additives 304 on the primary water flow. One aspect of the invention relates to monitoring and maintaining a balance between the chloride content of an aqueous frac fluid in relation to the type and amount of friction reducer that is present in the fluid. Generally speaking, various commercially available friction reducers are known to have associated chloride concentration ranges within which they are most effective. For example, some friction reducers are effective at chloride concentrations ranging up to 125,000 ppm and beyond, while many others are not effective at such high chloride concentrations in the treated fluid and are preferred for use only within a lower and narrower range of chloride concentrations. Accordingly, by using the method of the invention, one can choose a chloride set point at which a given friction reducer is known to be effective, and then use the system of the invention to blend inlet water from various sources to manage the chloride content of the fluid being treated within the effective range of that friction reducer. If for any reason the average chloride concentration of the source water or produced water changes substantially, it may become necessary to select a different friction reducer and/or a new chloride concentration set point that will accordingly adjust the amount of friction reducer being introduced into the flow through the system of the invention. It should be appreciated that this example is merely illustrative of benefits and advantages that can be achieved through use of the present invention, and that other benefits are likewise available by selectively adjusting either the blend of inlet water and other aqueous fluid being supplied to the chemical treatment section of the invention, or by selectively adjusting the type and amount of chemical treatment that is introduced into the fluid flow line.

Referring to both FIGS. 2A and 2B, frac tank recirculation lines 276, 278, 280 and 282 can be controlled to selectively discharge a controlled flow of frac water into tank recirculation line 284 that utilize auxiliary pump 283 to introduce the recirculated fluid into flow line 220 above take-off lines 224, 302 for injection of chlorine dioxide 230 and the other additives 304, respectively. Side stream 286 with sensors 288 is again provided to monitor and report to the PLC the flow parameters and chemistry of the recirculated aqueous liquid. This recirculation loop affords the user the opportunity to continuously readjust the chemistry and additive concentration levels of the recirculated fluid.

During hydraulic fracturing operations, frac water is selectively withdrawn from the individual frac tanks through lines 264, 266, 268, 270 using existing technologies and is discharged into blender 274, where it can be mixed with other fracturing fluid components and then pumped downhole as indicated by arrow 274.

Figure 3:
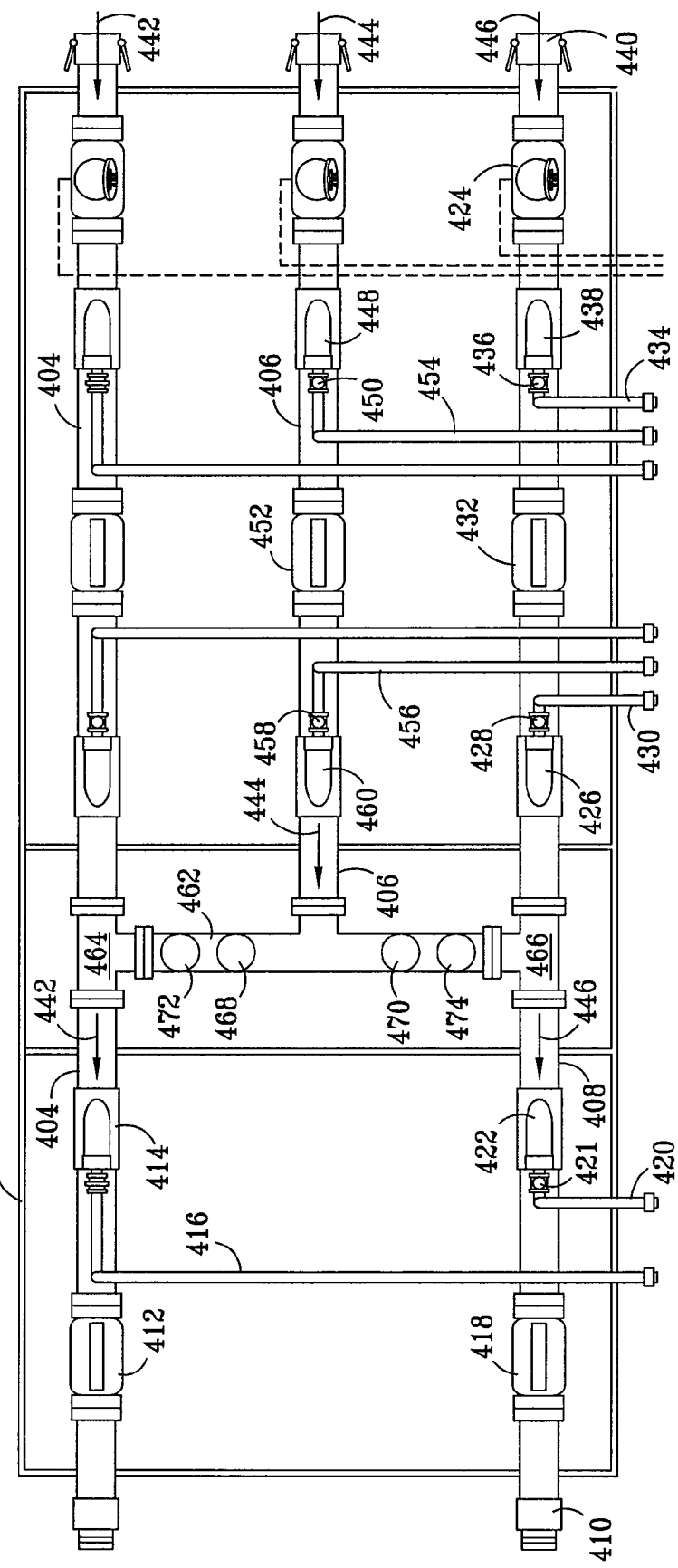
FIG. 3 is a simplified top plan view of one preferred embodiment of a portion of the portable frac water management system of the invention.
Figure 4:
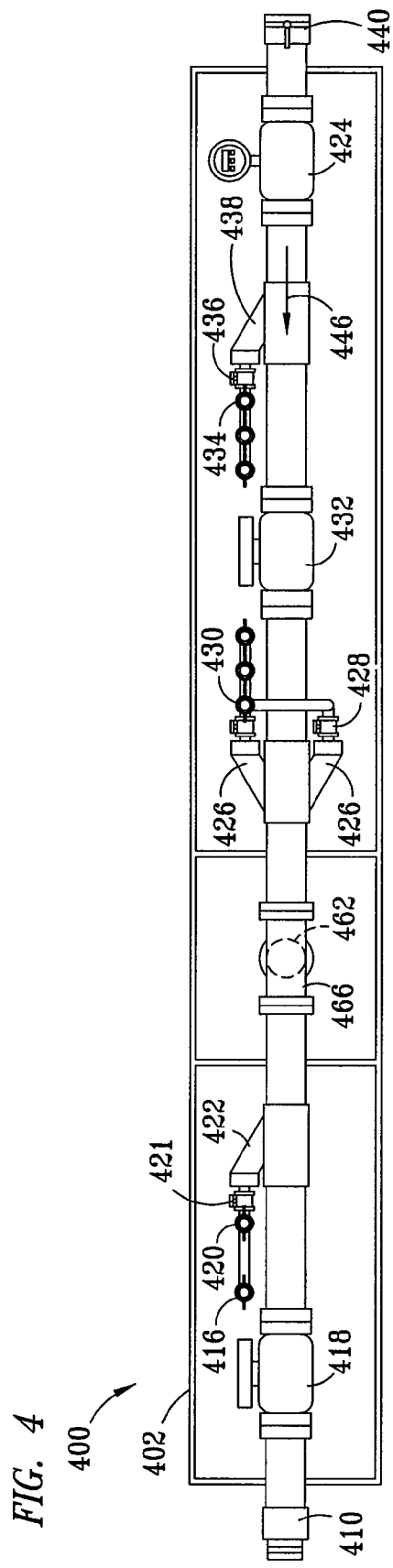
FIG. 4 is a simplified front elevation view of the portion of the portable frac water management system shown in FIG. 3.
Figure 5:
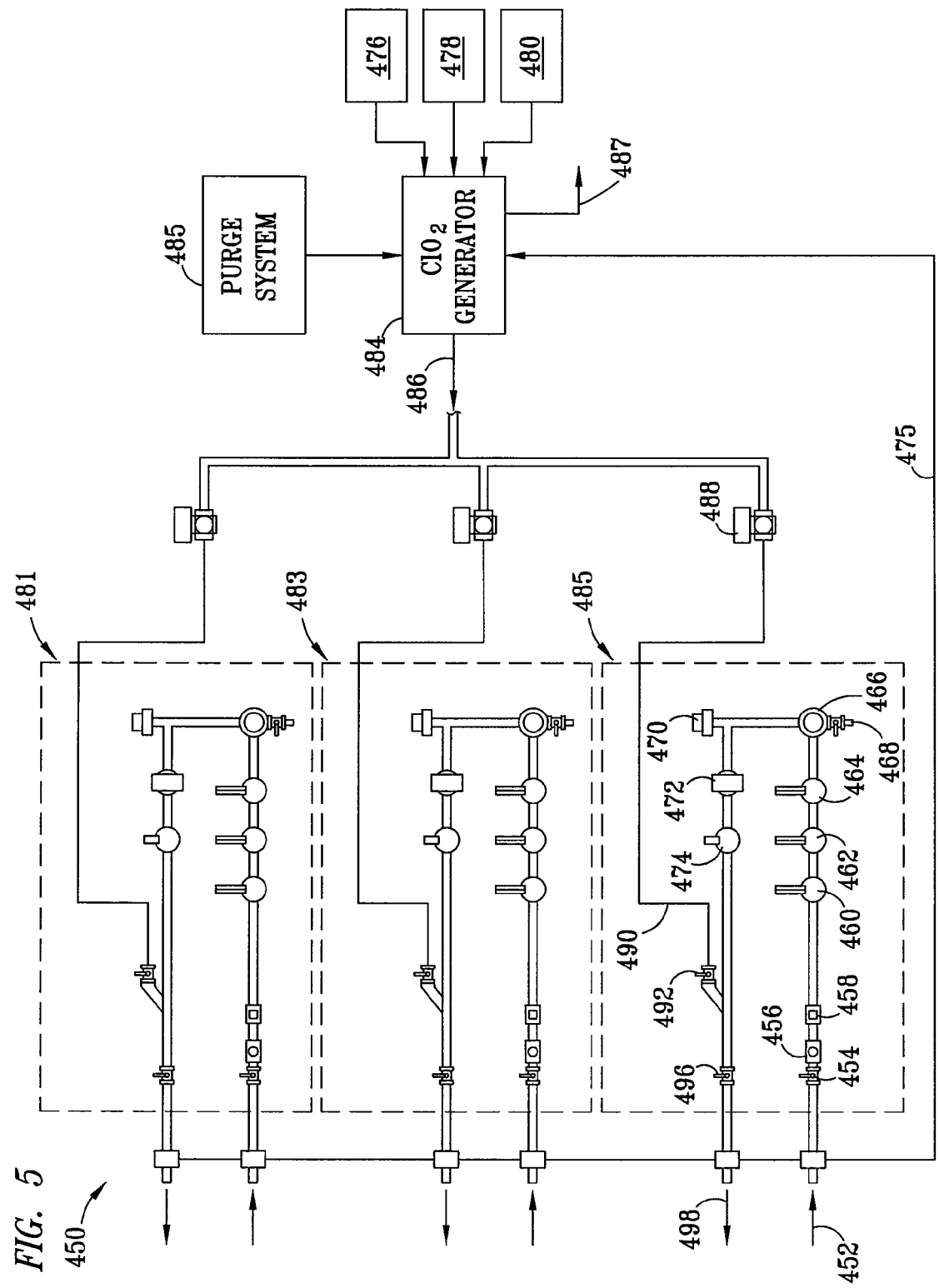
FIG. 5 is a simplified diagrammatic view of one embodiment of a preferred chlorine dioxide generation and handling system of the invention for use in practicing one preferred embodiment of the portable water treatment system and method of the invention using three precursors.

An illustrative primary flow configuration through trailer 12 as shown in FIG. 1 is depicted in FIGS. 3 and 4, and an illustrative sidestream flow through a chlorine dioxide introduction loop 450 is depicted in FIG. 5. Although a substantially linear piping layout is shown in FIGS. 3-4, it should be appreciated that the primary flow path can also be looped, for example, if needed due to space restrictions in a particular trailer 12 or other carriage device, and that the number of flow lines is not limited other than by space considerations. Referring first to FIGS. 3 and 4, piping and instrumentation comprising two parallel and substantially identical primary fluid flow paths embodied in lines 404, 408 for pressurized source water flows 442, 446, respectively, are shown for illustrative purposes. Each primary source water flow line is preferably connectable at its inlet end to one of the source water inlets as previously described, and at its outlet end to an outlet line flowing to manifold 14 disposed inside trailer 12 or between trailer 12 and the existing frac tanks as seen in FIG. 1. Flow line 406, shown here disposed between lines 404 and 408, supplies a flow of pressurized produced water as indicated by arrows 444.

Referring again to the illustrative apparatus of the embodiment of the invention as depicted in FIGS. 3-4, and particularly with regard to primary flow lines 408, female inlet coupling 440 is attachable, for example, to a source water supply line. Flow meter 424, preferably a MagMeter, is supplied at the inlet end, upstream of lateral wye 438, which redirects a relatively minor portion of the flow through valve 436 into line 434. The side stream thereby created can be used to introduce any additive such as, for example, a corrosion inhibitor, into the flow of source water. Following introduction of the additive, the side stream is reunited with the primary flow through line 408 through line 430, valve 428 and lateral wye 426. The flow scheme and instrumentation for flow line 404 is substantially identical to that of flow line 408.

Referring next to produced water flow line 406, after flow 444 passes through the quick-connect female coupling and flow meter, a portion of the flow is similarly redirected through wye 448 and valve 450 into line 454. In this case, line 454 can be used for the introduction of a scale inhibitor, for example, as previously discussed in relation to the method of the invention. It should be understood and appreciated, however, that other types of additives or treating chemicals could likewise be introduced into flow 444 of produced water through this side stream. Following reintroduction of the side stream flow through line 456, valve 458 and lateral return wye 460, flow 444 passes into tee 462, where the flow is redistributed by control valves 468, 470, preferably connected to a PLC, and smaller tees 464, 466 into source water flow lines 404, 408, respectively. Safety valves 472, 474 are also desirably provided in tee 462.

Downstream of the point of combination of treated produced water flow 444 with the treated source water flows 442, 446, lateral wyes 414, 422 are again provided in each of flow lines 404, 408. Referring again to line 408, and assuming for illustrative purposes that lateral wye 422 is intended to create a side stream for an injection point for chlorine dioxide, line 420 directs a sidestream that is identified in FIG. 5 by arrow 452 to the inlet side of one of three substantially identical chlorine dioxide manifolds 481, 483, 485 that are depicted at the left side of FIG. 5. The inlet flow of the sidestream passes through inlet valve 454, flow meter 458, chlorine dioxide sensor 460, ORP sensor 462, pH sensor 464, temperature and TDS sensor 466, past flow sensor 470, back-check valve 472, scale inhibitor injection point 474, past chlorine dioxide eductor 492, through valve 496, and back to return line 420 of FIG. 3 as indicated by arrow 498 in FIG. 5.

Referring to the right side of FIG. 5, chlorine dioxide precursors 476, 478 and 480, preferably comprising sodium hypochlorite, hydrochloric acid, and sodium chlorite, respectively, are introduced into chlorine dioxide generator 484 that incorporates each of the subsystems previously discussed. Chlorine dioxide produced in generator 484 exits through an outlet manifold as indicated by arrow 486 and flows through a motor operated control valve 488 into eductor 492. The flow of frac water containing the chlorine dioxide introduced into the sidestream through eductor 492 flows through outlet valve 496 and out of the treatment loop as indicated by arrow 498. As previously discussed in relation to FIG. 2, chlorine dioxide generator 484 is desirably provided with safety valves, alarms (preferably onsite and remote audio and visual alarms), and a purge system 485 and cleanout 487.

Referring again to FIG. 3, the returning flow of chemically treated frac water can be reintroduced into primary flow line 408 through a return line, valve and lateral wye (not shown), or can be diverted directly to a frac tank as previously described. Valve 418 is desirably provided to control downstream flow. Where the flow from the treated side stream re-enters primary flow line 408, turbulence is created that promotes dispersion and mixing of the chlorine dioxide throughout the source water flowing through line 408. Referring to FIG. 4, it is seen that lateral return wye 426 is a dual wye provided with two return positions so that the return flow can be further distributed if desired. Similarly, a dual wye can be used on the take-off side where the same or different additives are to be introduced at a single point in the flow stream. A principal purpose for creating another sidestream flow is to provide a secondary point for introduction of chlorine dioxide using a chlorine dioxide manifold as described above in relation to FIG. 5. Other sidestream flows can be similarly created for use in introducing other treating chemicals or additives into primary flow line 408, either by means of other sampling and eductor loops, or by sidestream loops utilizing injection pumps. In some situations, particularly where a portion of the primary frac water flow has been recirculated and introduced into primary flow line 408 from one or more individual frac tanks, the inlet flow to a treating chemical or additive introduction sidestream may be obtained from the use of multiple wyes and side streams.

Figure 6:
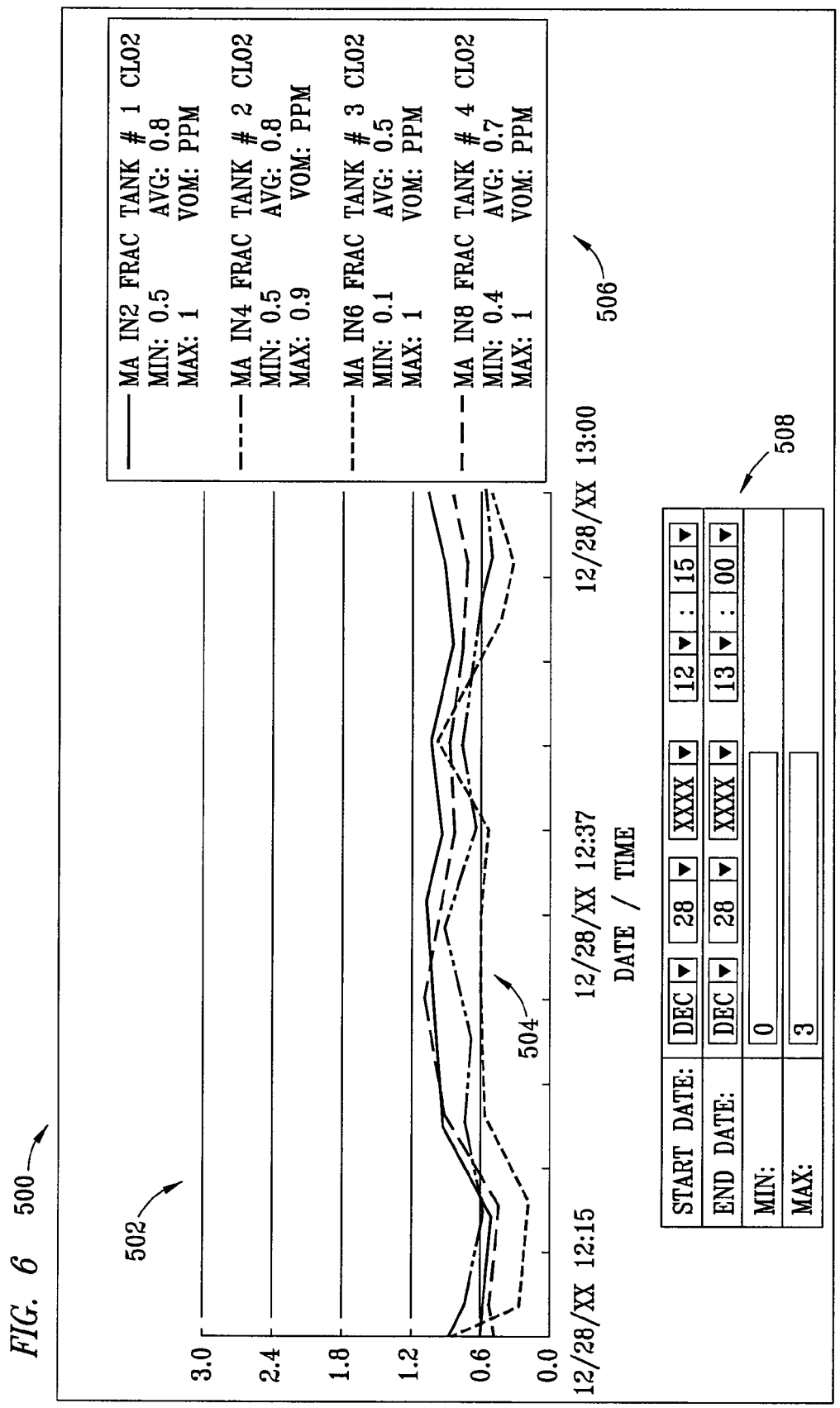
FIG. 6 is an example of a graphical record and printout generated according to a preferred embodiment of the instrumentation and control system for monitoring chlorine dioxide levels in an aqueous fluid treated in accordance with the system, method and apparatus of the invention.

Referring to FIG. 6, graphical report 500 is merely an illustrative example of the type of data than can be routinely gathered and of a report that can be generated using the system, method and apparatus of the invention. Graph 502 is a plot of chlorine dioxide concentration (ppm) over an indicated time interval, with separate plots 504 for each of four different frac tanks. Table 506 records by tank the treatment chemical (chlorine dioxide) being used, and the minimum, maximum and average chlorine dioxide concentrations (ppm) recorded for each tank. Table 508 records the minimum and maximum chlorine dioxide concentrations overall that were recorded during the reporting period for the four tanks. Use of portable water treatment system 10 as disclosed herein will not only provide operators with greater reliability and tighter control over chemicals and additives injected downhole, but will provide an accurate historical record of the chemistry and composition of the frac water pumped downhole should a need arise to establish such information in a reliable, systematic and trustworthy format.

In conclusion, the present invention allows the trending and correlation of other systems to help advance the chemistry of any subject process and the complete control and automation of the fluid entering into the hydraulic fluid fracturing process. The subject system can react to the ever-changing conditions of the fluid in each of the manifold's pipes since the fluid may be from more than one source and or different pick-up points from each source. The pumps pressures and fluid flow rates can also vary from pump to pump.

According to a preferred embodiment of the invention as disclosed herein, chlorine dioxide manifold 450 as disclosed in relation to FIG. 5 has in each of its three separate inlet lines a MagMeter as flow meter 458 to measure flow rates, a programmable flow switch 470, a series of valves on the inlet and outlet of each pipe, a special injection plate and/or fittings for chemical additions, and an inlet and outlet for a side stream flow of water that allows for the monitoring of the chemicals that are being introduced through the manifold. The manifold will measure the flow rate of fluid through the piping manifold in GPM, CFS, LPM, and may be converted into any quantifiable measurement and reports this locally and/or remotely. The subject manifold 450 relies on pressurized water flow from existing frac water pumps but auxiliary pumps 456 can be provided for recirculating fluids to the frac tanks. Flow meter 458 detects flow of fluid and sends a signal based on any measurement (such as "show flow when >1 GPM and "no flow" when <1 GPM) that is programmable set point and reports this locally and/or remotely.

With a series of valves and supply line outlets and return line inlets, portable treatment system 10 can divert a sidestream of fluid and flow that fluid to any other type of chemical treatment and monitoring process. In manifold 450, which will also allow for other chemical treatments to be injected directly into the manifold, each of the lines is independent from the others and therefore there are at least three separate systems and/or processes that all can work at the same time.

Manifold 450 will also allow for chemical treatments that are being injected into each line of the manifold to be injected in at one and/or multiple points so as to evenly distribute the chemistries into the primary flows of frac water through portable treatment system 10. This allows for a quicker reaction and a homogeneous blend between the chemistry and the ever-changing characteristics of the water.

Manifold 450 allows each 10-inch line to be treated differently and independently from the others. Since the water flowing through the manifold may not be from the same source and/or if from the same source the pick-up points may cause a variation in the water's characteristics.

Through use of the system, method and apparatus disclosed herein, control, adjustment, feed rates, spill detection remote control and calibrations of all chemicals for any and all part of the inlet fluids on a hydraulic fracturing process. The actual flow rate of fluid to be treated and the total quantity of fluid treated during each phase of the process and a total at the end of each process. Chemistries are best added in ppm based on actual fluids being used and no one is believed to be doing this.

Other alterations and modifications of the invention will likewise become apparent to those of ordinary skill in the art upon reading this specification in view of the accompanying drawings, and it is intended that the scope of the invention disclosed herein be limited only by the broadest interpretation of the appended claims to which the inventors are legally entitled.

We claim:

1. A portable frac water treatment and management system for in-line use downstream of a frac water supply and upstream of a plurality of frac tanks disposed at a well site, the system comprising:

at least one programmable controller;

at least one primary fluid flow line having at least one inlet end and at least one outlet end, the at least one inlet end having a first coupling device attachable in fluid communication with the frac water supply to receive a pressurized flow of aqueous fluid into the system, and the at least one outlet end having a second coupling device attachable in fluid communication with the plurality of frac tanks;

a first sensor disposed downstream of the at least one inlet end that monitors and communicates on a continuous, real-time basis to the at least one programmable controller a first parameter corresponding to a flow rate of the pressurized flow of aqueous fluid through the at least one fluid flow line;

a second sensor disposed downstream of the at least one inlet end that monitors and communicates on a continuous, real-time basis to the at least one programmable controller a second parameter corresponding to an initial concentration of chlorine dioxide in the pressurized flow of aqueous fluid;

at least one sidestream disposed downstream of the first and second sensors, which at least one sidestream diverts a portion of the pressurized flow of aqueous fluid for treatment with chlorine dioxide;

a chlorine dioxide generator disposed in fluid communication with an at least one sidestream, which chlorine dioxide generator generates a chlorine dioxide solution having a second concentration of chlorine dioxide that is regulated by the at least one programmable controller;

an eductor disposed in fluid communication with the chlorine dioxide generator and with the at least one sidestream, through which eductor chlorine dioxide solution is drawn into the at least one sidestream, thereby utilizing the pressurized flow of aqueous fluid as a motive force for introducing and mixing the chlorine dioxide solution into the at least one sidestream to produce a treated aqueous fluid having a chlorine dioxide concentration higher than the initial concentration of chlorine dioxide in the pressurized flow of aqueous fluid upstream of the at least one sidestream;

a third sensor disposed in the at least one sidestream at a location downstream of the eductor, which third sensor monitors and communicates on a continuous, real-time basis to the at least one programmable controller the concentration of chlorine dioxide in the treated aqueous fluid in the at least one sidestream at a location downstream of the eductor;

a plurality of treated aqueous fluid flow lines disposed downstream of the third sensor through which flow is selectively controllable by the at least one programmable controller to direct treated aqueous fluid directly to the frac tanks or back into the pressurized flow of aqueous fluid from which the at least one sidestream was diverted;

at least one recirculation flow line configured to recirculate the treated aqueous fluid from any of the plurality of frac tanks and introduce the treated aqueous fluid through a fourth sensor and into the pressurized flow of aqueous fluid at a point upstream of the at least one sidestream; and at least one motor vehicle or towable carrier unit within which the at least one programmable controller, first sensor, second sensor, at least one sidestream, chlorine dioxide generator, eductor and third and fourth sensors are self-contained for transport to the well site.

2. The portable frac water treatment and management system of claim 1, further comprising a manifold providing selective fluid communication between the chlorine dioxide generator and the plurality of frac tanks.

3. The portable frac water treatment and management system of claim 1 wherein the chlorine dioxide generator comprises an in-line chemical reactor that produces at least part of the chlorine dioxide solution.

4. The portable frac water treatment and management system of claim 3, comprising a purge system for the chemical reactor.

5. The portable frac water treatment and management system of claim 4 wherein the purge system comprises a neutralizing agent injectable into the chemical reactor.

6. The portable frac water treatment and management system of claim 1 wherein the at least one programmable controller comprises at least one on-site controller and at least one remotely located programmable controller.

7. The portable frac water treatment and management system of claim 1 wherein the pressurized flow of aqueous fluid comprises frac pond water associated with an oil or gas well.

8. The portable frac water treatment and management system of claim 1 wherein the pressurized flow of aqueous fluid comprises produced water from an oil or gas well.

9. The portable frac water treatment and management system of claim 1 wherein the pressurized flow of aqueous fluid is divided into a plurality of flow paths upstream of the at least one sidestream comprising an eductor.

10. The portable frac water treatment and management system of claim 1 wherein the at least one primary fluid flow line is looped or coiled within the at least one motor vehicle or towable carrier unit.

11. The portable frac water treatment and management system of claim 1 wherein the at least one recirculation flow line and the at least one programmable controller have the capability to selectively recirculate the treated aqueous fluid either continuously or intermittently from at least one of the plurality of frac tanks to the at least one primary fluid flow line at a point upstream of the at least one sidestream comprising an eductor for introducing chlorine dioxide solution.

12. The portable frac water treatment and management system of claim 1 wherein the at least one recirculation flow line and the at least one programmable controller have the capability to selectively recirculate the treated aqueous fluid either independently from at least one of the plurality of frac tanks or by consolidation from the plurality of frac tanks into a single return header to at least one primary fluid flow line at a point upstream of the at least one sidestream comprising an eductor for introducing chlorine dioxide solution.

13. The portable frac water treatment and management system of claim 1 wherein the treated aqueous fluid has a free residual level of chlorine dioxide that is between about 0.25 ppm and about 5.0 ppm.

14. The portable frac water treatment and management system of claim 1 wherein the at least one programmable controller has the capability to log and store physical and compositional parameters of the treated aqueous fluid on a continuous, real-time basis.

15. The portable frac water treatment and management system of claim 14 wherein the at least one programmable controller selectively reports the stored physical and compositional parameters.

* * * * *